United States Patent

Dym

[15] 3,668,313

[45] June 6, 1972

[54] RESISTIVE GRID GRAPHIC DATA TABLET

[72] Inventor: Herbert Dym, Mahopac, N.Y.

[73] Assignee: International Business Machines Corporation, Armonk, N.Y.

[22] Filed: Apr. 30, 1970

[21] Appl. No.: 33,462

[52] U.S. Cl. ....178/19

[51] Int. Cl. ....G08c 21/00

[58] Field of Search ....178/18, 19; 340/347; 33/1 M

[56] References Cited

UNITED STATES PATENTS

| | | | |
|---|---|---|---|
| 2,975,235 | 3/1961 | Leitner et al. | 178/18 |
| 3,399,401 | 8/1968 | Ellis et al. | 340/347 |
| 2,704,305 | 3/1955 | McLaughlin et al. | 178/18 |
| 3,286,028 | 11/1966 | Gray et al. | 178/18 |
| 3,304,612 | 2/1967 | Proctor et al. | 178/18 |
| 3,466,646 | 9/1969 | Lewin | 340/347 |

*Primary Examiner*—William C. Cooper
*Assistant Examiner*—Thomas L. Kundert
*Attorney*—Hanifin and Jancin and Victor Siber

[57] ABSTRACT

A two-dimensional graphic data entry tablet for transforming a positional information into a digital input to a computer system. The tablet structure consists of two continuous resistance lines superimposed on each other. Each of these lines being in the form of a grid and representing position in one of said two dimensions. A voltage differential is applied to each of the grids in order to create a voltage gradient along the path of the grid wires. An analog positional information is created by sensing grid voltage with a capacitively coupled stylus. By having the stylus viewing area cover a plurality of wires, the sensed potential averages out and represents a position directly related to the center location of the stylus on the faceplate of the tablet. The resistive grid lines provide the dual function of resistive bleeding and presenting a potential gradient to a capacitively coupled stylus.

5 Claims, 7 Drawing Figures

INVENTOR
HERBERT DYM

BY Victor Siber
AGENT

RESISTIVE GRID GRAPHIC DATA TABLET

RELATED PATENT APPLICATIONS

This application incorporates by reference application Ser. No. 772,295, filed Oct. 31, 1968, now U.S. Pat. No. 3,582,962 entitled, "Hand Entry Position Measuring System," and application Ser. No. 856,745, filed Sept. 10, 1969, now U.S. Pat. No. 3,593,115, entitled "Capacitive Voltage Divider;" both assigned to the same assignee as the present application.

This application also references copending application Ser. No. 33,400, filed on the same day as the present application, entitled "Triple Sample A/D Converter," assigned to the same assignee as the present application.

BACKGROUND OF THE INVENTION

The present invention relates to a capacitively coupled graphic data entry tablet. More particularly, it relates to a tablet having a plurality of grid lines that provide the dual function of resistive bleeding and the creation of a potential gradient across the faceplate of the tablet.

Electronic position transducers, and particularly electronic writing tablets, employing a tablet-stylus arrangement are well known in the art. A variety of techniques have been employed for electronically determining in time the position of the stylus as it is moved across the surface of the tablet. Some of these techniques are described in co-pending application Ser. No. 772,295 now U.S. Pat. No. 3,582,962. As stated in said application, both analog and digital techniques have been employed in the prior art to derive positional information from a transducing tablet. One approach used in analog voltage driven tablets is to utilize some form of voltage division arrangement that causes a voltage drop of the driving voltage as a function of position. An approach to deriving the desired voltage drop is to have bleeder resistors along the side of the tablet and grid lines which tap off at various points of the bleeder and introduce the potential across the dimensions of the tablet. This type of arrangement necessitates a very critical arrangement of resistances in the bleeder circuits in order to achieve linearity of the voltage gradient across the tablet.

Another type of tablet which is known in the prior art, is the active magnetic stylus type. In this type of device, the pen acts as a magnetic field source that transmits signals to the tablet structure. The tablet consists of a plurality of grids each associated with one bit in the digital position. Inherent in this type of structure is the necessity to have a great quantity of lines running across the tablet to achieve a desired resolution. This, in effect, increases the cost of manufacturing an acceptable tablet structure.

Various other approaches are known in the prior art for translating graphical input information into a digital position. For example, some systems have been developed which require electrical contact between the stylus and the grid lines, and others utilize a conducting stylus to close circuits which relate to positional information.

Accordingly, it is an object of the present invention to provide an improved graphic data tablet.

It is a further object of the present invention to provide a capacitively coupled graphic data tablet having high resolution with a minimum number of grid layers.

It is a further object of the present invention to eliminate the need for external resistive bleeding in an analog graphic data tablet.

It is a further object of the present invention to create a voltage gradient across the surface of the graphic data tablet by means of a single resistive wire for each dimension.

It is a further object of the present invention to provide a capacitively coupled graphic data tablet which is insensitive to small variations in elevation of the stylus above the faceplate of the tablet.

The foregoing and other objects, features and advantages of the invention will be apparent from the following more particular description of a preferred embodiment of the invention, as illustrated in the accompanying drawings.

SUMMARY OF THE INVENTION

In accordance with the principles of the present invention, there is provided a graphic tablet structure which linearly translates graphical positional information into digital electrical information by means of a capacitively coupled tablet stylus system. Two resistive grid lines, each associated with one dimension, are arranged one on top of the other in a tablet structure for generating a voltage gradient in each of said dimensions. Each of the grids in the tablet are sequentially energized to create voltage gradients in their respective dimensions so that position location of the stylus may be translated by means of the gradient value directly underneath the stylus sensing area.

The wire in each of the dimensions is arranged in a serpentine manner and possesses the property of having an approximately constant resisivity in order to create a linear voltage drop with respect to increasing distance from the signal source. The spacing of the wires is chosen in accordance with a spread function of stylus. That is, the wires are spaced relative to the viewing area of the stylus so as to insure that the stylus senses a plurality of wires for each position on the faceplate of the tablet. Thus, the potentials sensed by the pen tend to average out to a voltage that is directly proportional to dimensional position.

DETAILED DESCRIPTION OF THE INVENTION

Figures 1, 2:
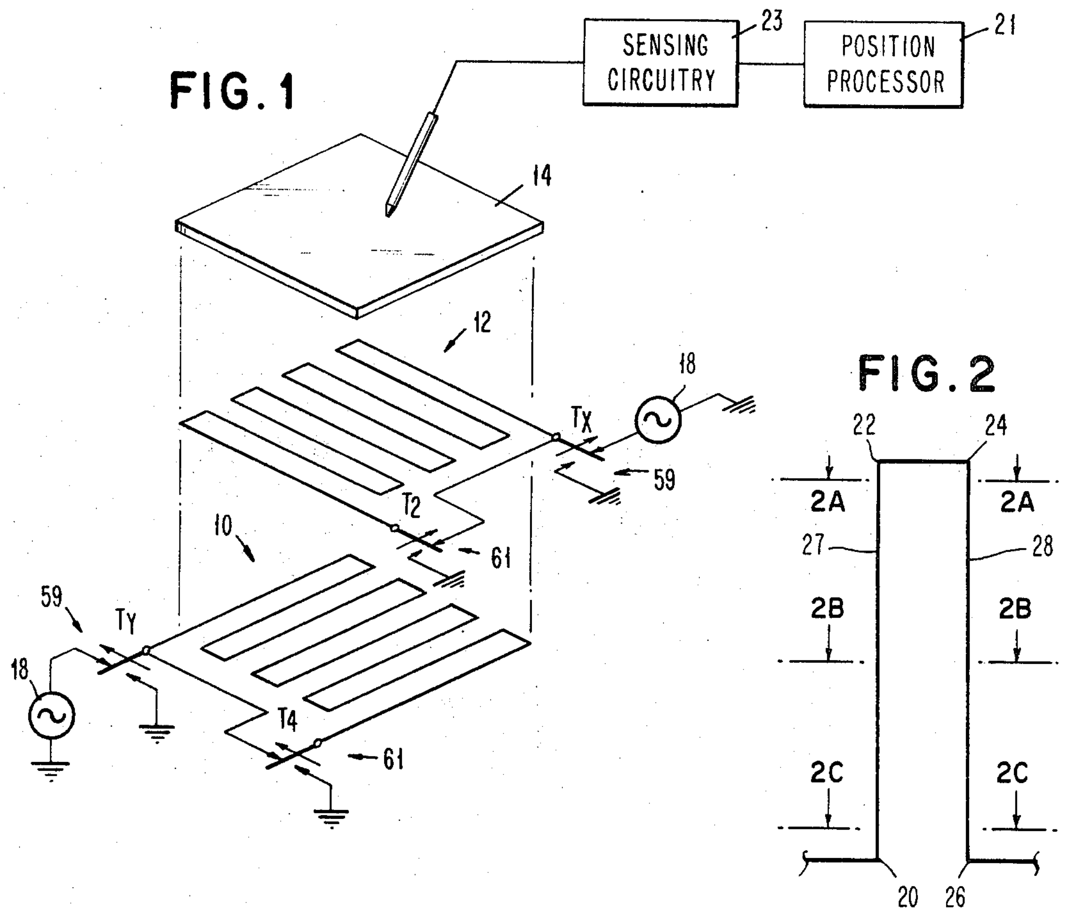
FIG. 1 shows a two-dimensional serpentine resistive wire arrangement in accordance with the principles of the present invention.
FIG. 2 shows a single loop of wire in one of the grids of the tablet and FIGS. 2A, 2B, and 2C show three sample position locations.

Referring to FIG. 1, there is shown the layered structure of the graphic data tablet. The tablet consists of a Y serpentine grid arrangement 10 that is overlayed by an X serpentine grid structure 12. Overlaying both the X and Y grid lines, there is shown an encapsulating surface 14. This encapsulant may consist of plastic, epoxy, glass or other material.

Both the grid lines 10 and 12 are connected to signal source drivers 18 and internal switches 59 and 61. This drive and switching arrangement is the same that is used in co-pending application, Ser. No. 856,745, now U.S. Pat. No. 3,593,115, and is operated in an identical manner as described in that application.

In the preferred embodiment, the tablet structure consists of a surface approximately 11 inches square with the serpentine wires 10 and 12 being formed of No. 42 copper wire arranged so as to have spacing between the wires of approximately 80 mils. This arrangement gives a linear voltage drop along the wires 10 and 12 with minimum effect of intergrid capacitance. The voltage gradient is orthogonal to the direction of the current flow in the serpentine wire of the grids.

It should be recognized by those skilled in the art, that while the arrangement shown in the preferred embodiment consists of a two-dimensional structure with the lines in the grid arranged in a parallel fashion, it is possible to construct other arrangements for other coordinate systems. For example, it is possible to build a tablet structure that operates in a polar coordinate system. Modification for this system would involve arrangement of the grid wires in a corresponding coordinate structure. Another modification which is considered to be within the skill of the art, is the compensation for non-uniform arrangement of resistive wires by changes in the uniformity of resistivity of the wire component.

Figure 3:
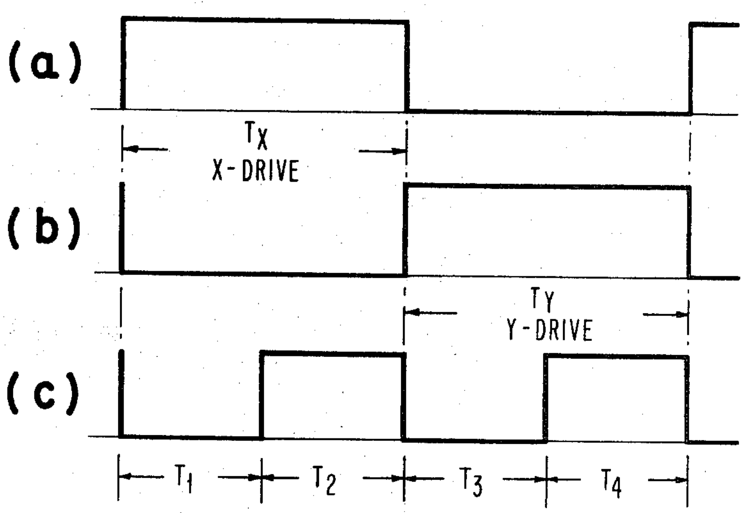
FIG. 3 shows the relationship of the time intervals during which the dimensional grids of the tablet are energized.

With reference to FIGS. 3 in conjunction with FIG. 1, the switching of the electrical signals to the tablet will now be discussed. As shown in FIG. 3, there are two drive times associated with determining each X and Y position. That is, an X drive time covering the period $T_1$ and $T_2$ and a Y drive time covering the period $T_3$ and $T_4$. These time periods $T_1$ through $T_4$ shall be referred to as sub-intervals. Assuming that it is desired to first determine the position of the stylus in the X dimension, switch 59 will begin its T drive time by engaging the signal source to the serpentine grid line. Switch 59 remains engaged in its $T_1$ drive position during the intervals $T_1$ and $T_2$. Furthermore, during this same interval, switches 59 and 61 associated with the Y grid line are connected to the ground side so that no signal gradient exists for the Y dimension during $T_1$ and $T_2$ sub-intervals. At the end of sub-interval $T_1$, drive switch 61 associated with the X dimension is engaged to the signal source 18 for the entire sub-interval $T_2$. Thus, for this sub-interval $T_2$, the entire X grid line is at an equal potential due to the fact that signal source is impressed on both sides of the serpentine grid. The placement of the X grid line at an equal potential provides a reference signal to be used by the position processor 20. Positional information is translated into a digital signal by comparing a positional voltage with a reference voltage in a manner as described in co-pending application Ser. No. 772,295 now U.S. Pat. No. 3,582,962, or application Ser. No. 33,400.

In a similar manner as described for the X dimension, the Y dimension will be operated during intervals $T_3$ and $T_4$ in accordance with the timing diagrams of FIG. 3. During the activation of the Y drive line, the X grid will be maintained at ground potential so as to avoid capacitive interaction between the grid planes. In order to minimize the possibility of any capacitive interaction between the grid planes, the resistivity of the wire is chosen so that there is a minimum of induced voltage in the inactive grid.

Referring to FIG. 2, there is shown a single loop in one of the grids which shall be used to illustrate the voltage averaging effect of the specific stylus sensing area relative to the serpentine arrangement of resistive wire. In FIG. 2, there is shown three cross sections, a first cross section at the upper portion of the loop, a second in the middle, and a third in the lower portion of the loop. For illustrative purposes, it shall be assumed that the wire is designed to have a one volt drop from one side of the loop to the other. Thus, if point 20 was at a potential of 16 volts, then point 22 and 24 would be a potential of 17 volts and point 26 at a potential of 18 volts.

Figure 2A:
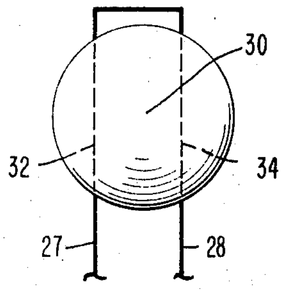

Referring now to FIG. 2A, there is shown a top view of the stylus above the upper portion of a single loop of one of the grids. The stylus in this FIG. is positioned near the top portion of the loop. It should be recognized that the figures used in the drawings are illustrative and are not necessarily to scale. Thus, the voltage at the turn-around points in the grid are in practice at the same potential on both sides of the turn-around. For example, both points 22 and 24 in FIG. 2 are at 17 volts even though a finite distance of wire is shown between the two points.

Figure 2B:
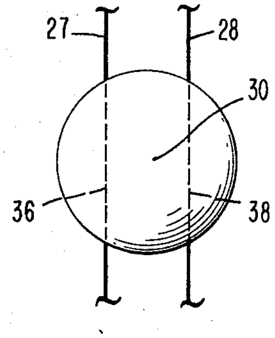
Figure 2C:
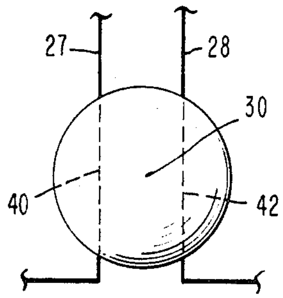

With the stylus at the upper portion of the loop, and the center of the sensing area being between two lines 27 and 28, the stylus is in a position to average out all of the potentials which are in its sensing area and arrive at some average value representative of the center position 30. Consider the same voltage distribution as discussed above, 2A. Then at point 32, the voltage potential would be 16.9 volts and at point 34, the voltage present is a value of 17.1. Similarly, the pen would receive voltage effects from all of the area underneath the circle. All of these potential points underneath the viewing area are averaged out and appear as a single potential of 17 volts. Continuing this illustration, it will now be shown that the voltage value of 17 is detected all the way down the center line of the loop shown in FIG. 2. In FIG. 2B, the viewing area of the stylus is shown about the center of the loop. Thus, at point 36 the potential would appear as 16.5 volts and at point 38 a potential of 17.5 volts appear. Again, by averaging these two quantities it is seen that 17 volts is the resultant signal detected by the pen. In a similar manner, FIG. 2C shows that the potential at point 30 is still maintained at 17 volts by averaging the 16.1 potential at point 40 and the 17.9 potential at point 42. It should be recognized by those skilled in the art, that these examples are merely illustrative and in actual practice there is a voltage gradient underneath the viewing area of the pen. It is this voltage gradient that is effectively averaged to determine a resultant potential corresponding to point 30.

The voltage gradient which is created across the tablet by means of the bleeding effect of the resistance line is linear in each of the X and Y dimensions. For example, considering movement in the X dimension, positional changes of the stylus in the X dimension cause different potentials to be detected by sensing circuitry 23. While changes in the Y dimension will not cause any change to be detected by the sensing circuitry during an X drive period since there is no gradient in the Y dimension along the X grid. Similarly, the same principles apply to movements in the Y dimension relative to the Y drive time.

Figure 4:
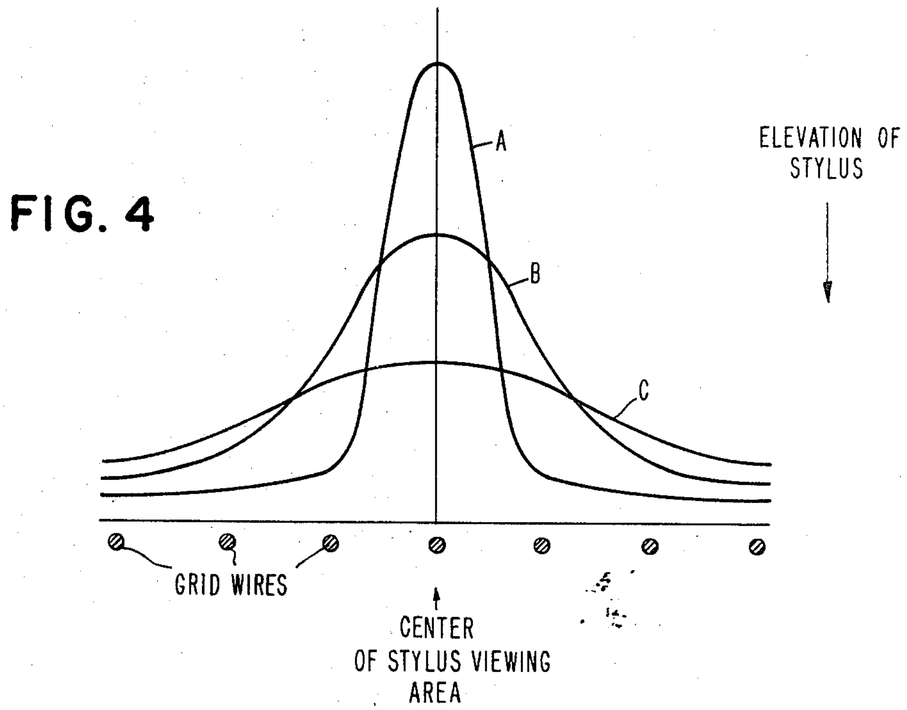
FIG. 4 shows a graphical representation of sense area spread function for a capacitively coupled stylus.

Now referring to FIG. 4, there is shown a graphical representation of the sensing area spread function of the capacitively coupled stylus. The three curves in this Fig. represent the number of wires having influence on the stylus depending on elevation of the stylus from the surface of the grid. For example, curve A represents a positioning of the stylus in very close proximity to a single wire in one of the planes. This close placement of the stylus tends to narrow the effective sensing area by minimizing the influence of the potentials emanating from surrounding wires. Curve B shows the effective sensing area for the stylus position at the surface of the tablet. The curve shows that the effective viewing area of the stylus at this level is approximate two wires in diameter. Curve C shows the spread function or sensing area for the pen positioned approximately a quarter of an inch above the tablet. This case would occur, for example, when the tablet operator interposes a pad of paper between the stylus and the tablet. It is significant that curves A, B and C of FIG. 4 are symmetrical about the point directly underneath the center of the pen. Thus, the averaging effect of the potentials contributed by surrounding wires is present regardless of the elevation of the pen above some minimal height which is the thickness of encapsulating layer 14.

It should be recognized by those skilled in the art that the specific examples taken along the center between two lines in a loop is illustrative of any of the loops within the grids. Furthermore, if the center point of the viewing are were to be placed over one of the grid lines, a different averaging effect would be present. However, the approximate resultant signal is still substantially linear with respect to position orthogonal to the direction of current flow in the loop.

For the purposes of illustration, the wire is shown as being displaced at right angles of the corners in order to form the loop. This is indicated in this manner in order to simplify the drawing. However, in order to achieve the best possible results in terms of linearity near the edges of the loops, it is necessary that the resistance of the edge wire be uniform. Another approach would be to joint the ends with a conductor of different resistivity than the resistive wire of the grids. So long as the serpentine arrangement is maintained, linearity is still achieved.

The preferred embodiment of this invention has been restricted to a two-dimensional coordinate system tablet requiring a linear voltage gradient. However, other coordinate systems could be used in accordance with the principles of the invention so long as the relationship between the resistivity of the line and the spread function of the stylus is maintained to achieve some relationship that may be decoded into an electrical signal relative to position. In the preferred embodiment, a voltage gradient created by the serpentine arrangement of resistive wires enables any degree of resolution which is desired so long as the sensing circuitry can make proper detection. Thus, resolution is not dependent on wire spacing because the voltage gradient sensed by the stylus is continuous in a direction orthogonal to current flow in the grid wires. The resolution is a function of signal to noise ratio of the sampling circuit and the decoding circuit rather than a function of the grid layout.

While the preferred embodiment has been described with respect to a sequential application of a potential differential to each of said grid planes, it should be recognized by those skilled in the art that other techniques of impressing an analog signal on the grid planes are possible. For example, one technique would be to simultaneously apply two AC signals of different frequencies to the X and Y grid planes. This would enable simultaneous transducing of the X and Y positional information.

What is claimed is:

1. A system for translating two-dimensional positional information into electrical signals that represent any position on a two-dimensional surface comprising:

a tablet structure having a first and second grid plane each consisting of a plurality of closely spaced resistive lines;

said resistive lines of said first grid plane being arranged so as to lie along a first dimension and said plurality of resistive lines of said second grid plane being arranged to lie along a second dimension;

said resistive lines in each of said planes being connected at alternate ends so as to form two independent continuous electrical paths each associated with only one of said dimensions;

signal source means for applying a potential differential across said grid planes;

capacitively coupled sensing means having an effective sensing area over a plurality of said closely spaced lines; so that said resistive lines are in sufficient proximity to each other relative to the effective sensing area of said sensing means so that the electrical field generated by the plurality of resistive lines in each of said planes appears as a continuous potential gradient in a dimension orthogonal to the dimension in which the lines are arranged;

said two-dimensional positional information being created by the placement of said sensing means in close proximity of the face of said tablet, so that upon the application of a potential differential across said grid planes, electrical signals proportional to said two-dimensional positional information is detected by said sensing means.

2. A system as defined in claim 1 wherein said resistive lines are of constant resistivity.

3. A system as defined in claim 2 further comprising:

control means for sequentially applying a potential differential to said first and second grid planes respectively;

4. A system as defined in claim 3 further comprising signal switching means for first applying a potential differential across said grid planes and secondly applying an equal potential across said grid planes.

5. A system as defined in claim 4 wherein said resistive lines in each of said grid planes are arranged parallel to each other.

* * * * *